(12) United States Patent
Walker et al.

(10) Patent No.: US 9,705,124 B2
(45) Date of Patent: Jul. 11, 2017

(54) HIGH ENERGY DENSITY LI-ION BATTERY ELECTRODE MATERIALS AND CELLS

(75) Inventors: Jeremy D. Walker, Washington, DC (US); Jeffrey P. Maranchi, Clarksburg, MD (US); Edward D. Russell, Columbia, MD (US); Jennifer L. Sample, Bethesda, MD (US); Marcia W. Patchan, Columbia, MD (US); Lance M. Baird, Baltimore, MD (US); Rengaswamy Srinivasan, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 464 days.

(21) Appl. No.: 13/588,082

(22) Filed: Aug. 17, 2012

(65) Prior Publication Data

US 2013/0220817 A1     Aug. 29, 2013

Related U.S. Application Data

(60) Provisional application No. 61/603,506, filed on Feb. 27, 2012.

(51) Int. Cl.
| | |
|---|---|
| *H01M 4/04* | (2006.01) |
| *H01M 4/58* | (2010.01) |
| *H01M 4/52* | (2010.01) |
| *H01M 10/0525* | (2010.01) |

(52) U.S. Cl.
CPC ....... *H01M 4/0402* (2013.01); *H01M 4/0452* (2013.01); *H01M 4/523* (2013.01); *H01M 4/58* (2013.01); *H01M 10/0525* (2013.01)

(58) Field of Classification Search
USPC .......................................... 205/59
See application file for complete search history.

(56) References Cited

U.S. PATENT DOCUMENTS

| | | | |
|---|---|---|---|
| 5,098,516 A * | 3/1992 | Norman et al. ................ 216/78 |
| 6,737,191 B2 | 5/2004 | Gan et al. | |
| 7,316,867 B2 | 1/2008 | Park et al. | |
| 7,745,047 B2 | 6/2010 | Zhamu et al. | |
| 7,906,236 B2 | 3/2011 | Lee et al. | |

(Continued)

FOREIGN PATENT DOCUMENTS

| | | | | |
|---|---|---|---|---|
| CN | 101222037 | * | 7/2008 | ............... C01B 9/08 |
| WO | 2010081170 | | 4/2010 | |
| WO | 2011127384 | | 10/2011 | |

OTHER PUBLICATIONS

Li, L., et al., "Facile Solution Synthesis of alpha-FeF3.3H2O Nanowires and Their Conversion of alpha-Fe2O3 Nanowires for Photoelectrochemical Application", Nano Letters, 12, 724-731, 2012.*

(Continued)

*Primary Examiner* — Harry D Wilkins, III
(74) *Attorney, Agent, or Firm* — Noah J. Hayward (57) ABSTRACT

A method of preparing a high capacity nanocomposite cathode of $FeF_3$ in carbon pores may include preparing a nanoporous carbon precursor, employing electrochemistry or solution chemistry deposition to deposit Fe particles in the carbon pores, reacting nano Fe with liquid hydrofluoric acid to form nano $FeF_3$ in carbon, and milling to achieve a desired particle size.

2 Claims, 12 Drawing Sheets

(56) References Cited

U.S. PATENT DOCUMENTS

| | | |
|---|---|---|
| 2003/0175589 A1* | 9/2003 | Kaminaka et al. ........ 429/218.1 |
| 2008/0199772 A1 | 8/2008 | Amatucci et al. |
| 2009/0246636 A1 | 10/2009 | Chiang et al. |
| 2010/0323244 A1 | 12/2010 | Chiang et al. |
| 2011/0189510 A1 | 8/2011 | Caracciolo et al. |
| 2011/0200848 A1 | 8/2011 | Chiang et al. |

OTHER PUBLICATIONS

Li, T., et al., "Reversible Three-Electrode Redox Behaviors of FeF3 Nanocrystals as High-Capacity Cathode-Active Materials for Li-ion Batteries", J. Phys. Chem. C., 114, 3190-3195, 2010.*

Francke, L., et al. "Synthesis and Characterization of Al3+, Cr3+, Fe3+, and Ga3+ hydroxyfluorides: Correlations Between Structural Features, Thermal Stability and Acidic Properties", J. Mater. Chem., 13, 2330-2340, 2003.*

Li, C., et al., "Low Temperature Ionic-Liquid Based Synthesis of Nanostructured Iron-Based Fluoride Cathodes for Lithium Batteries" Advanced Materials, 22, 3650-3654, 2010.*

Kim, S-W., et al., "Fabrication of FeF3 nanoflowers on CNT branches and their application to high power lithium rechargeable batteries", Advanced Materials, 2010, 22, 5260-5264.*

Fichtner, M., "Nanoconfinement effects in energy storage materials", PCCP, 2011, 13, 21186-21195.*

Francke, L., et al., "Synthesis and characterization of Al3+, Cr3+, Fe3+, and Ga3+ hydroxygluorides: correlations between structural features, thermal stability and acidic properties", J. Mater. Chem., 2003, 13, 2330-2340.*

Wang et al, Electrochemical properties of carbon coated LiFePO4 cathode materials, Journal of Power Sources, Jun. 2005, vol. 146, No. 1-2, p. 521-524.*

Li et al, Structural and Electronic Properties of Li-Ion Battery Cathode Material FeF3, Journal of Physical Chemistry C, vol. 114, No. 39, Sep. 2010, pp. 16813-16817.*

R. Ma et al, Fabrication of FeF3 nanocrystals dispersed into a porous carbon matrix as a high performance cathode material for lithium ion batteries, Journals of Materials Chemistry A, 2013, Oct. 1, 2013, pp. 15060-15067.*

Frederic Cosandey et al., Eels Spectroscopy of FEF2/C and FEF3/C Nanocomposites used as Positive electrodes in Li-Ion Batteries; pp. 1-2.

Frederic Cosandey et al., Valence Mapping by EELS for Fefx/C Nanocomposites for Li-Ion Battery Electrodes; SHaRE User Research Highlight; p. 1.

George Lauro; Nanotech Supplier Illuminex Corporation Closes Angel round of Funding; PRWeb ebooks—Another online visibility tool from PRWeb; pp. 1-3.

Pu Wang et al.; Carbon-Coated Si-Cu/graphite Composite as Anode Material fro Lithium-ion Batteries; International Journal of Electrochemical Science; 1(2006) 122-129.

Angathevar Veluchamy et al., Silicon Based Composite Anode for Lithium Ion Battery; pp. 335-360.

Wanli Zu; Silicon Nanowire Anode for Lithium-Ion Batteries: Fabrication, Characterization and Solid Electrolyte Interphase; Submitted to the Graduate Faculty of the Louisiana State University and Agriculture and Mechanical College in partial fulfillment of the requirements for the degree of Doctor of Philospky in the Gordon A. and Mary Cain Dept. of Chemical Engineering; pp. 1-167.

* cited by examiner

FIG. 1.

Nanomaterial Battery

Cathode Material
nano $FeF_3$:C composite
~ 600 mAh/g, 2.5 V vs Li/Li+

Anode Material
nano Cu:Si composite
~ 2800 mAh/g, 0.2 V vs Li/Li+

HIGH ENERGY DENSITY LI-ION BATTERY ELECTRODE MATERIALS AND CELLS

CROSS-REFERENCE TO RELATED APPLICATIONS

This application claims the benefit of U.S. Provisional Application No. 61/603,506 filed on Feb. 27, 2012, the entire contents of which are hereby incorporated herein by reference.

TECHNICAL FIELD

Example embodiments generally relate to battery technology and, more particularly, relate to a mechanism for providing high energy density electrodes for batteries.

BACKGROUND

Batteries are electrochemical cells that convert stored chemical energy into electrical energy. Batteries have been desirable sources of electrical energy due to the fact that they can deliver energy without the mobility restrictions provided by a corded connection to mains power systems. Two main types of batteries include primary (or disposable) batteries and secondary (or rechargeable) batteries. Primary batteries are generally able to produce current immediately after they are assembled. However, primary batteries are intended to be discarded after their charge is depleted since the chemical reactions utilized therein are generally not reversible. Secondary batteries must generally be charged before use. However, after charge depletion they can be recharged since the chemical reactions utilized therein are reversible.

As different types of batteries have been developed and improved over the years, research has continued to focus on improving energy density, durability and safety, while decreasing cost. Reduction or elimination of memory effect, a phenomenon whereby batteries gradually lose their maximum energy capacity if they are repeatedly recharged after being only partially discharged, has also been a focus of many past research efforts.

One of the top performing rechargeable batteries that has evolved from the efforts described above has been the lithium-ion (Li-ion) battery. The Li-ion battery generally provides a relatively high energy density, no memory effect, and relatively low charge loss when not in use. Due to its performance capabilities, Li-ion batteries have been preferred for many applications including the provision of power to satellites and other payloads that are to be used in space missions. The relatively high energy density provided by Li-ion batteries means that space bound satellites or payloads may be effectively powered with less weight. However, the relatively high cost of Li-ion batteries may significantly add to the cost of such batteries when they are used in space applications.

BRIEF SUMMARY OF SOME EXAMPLES

Accordingly, some example embodiments may enable the provision of Li-ion batteries with even higher energy densities. Thus, the same electrical capacity may be provided with significantly less weight and cost. Some example embodiments may provide scalable methods for creating nanostructured electrode materials that improve the performance of Li-ion batteries.

In one example embodiment, a method of providing electrode materials for a battery cell is provided. The method may include preparing a high capacity nanocomposite cathode of $FeF_3$. In some cases, the high capacity nanocomposite cathode of $FeF_3$ may be prepared in carbon pores by preparing a nanoporous carbon precursor, employing electrochemistry or solution chemistry deposition to deposit Fe particles in the carbon pores, reacting nano Fe with liquid hydrofluoric acid to form nano $FeF_3$ in carbon, and milling to achieve a desired particle size. The method may further include preparing a high capacity nanocomposite anode of Cu and Si by creating a Cu:Si interface via electrodeposition or physically forming Cu around Si by milling, and annealing to enhance atomic intermixing. The method may further include combining the high capacity nanocomposite cathode with the high capacity nanocomposite anode for a high energy density Lithium-ion battery cell.

According to another example embodiment, a method of preparing a high capacity nanocomposite cathode of $FeF_3$ in carbon pores is provided. The method may include preparing a nanoporous carbon precursor, employing electrochemistry or solution chemistry deposition to deposit Fe particles in the carbon pores, reacting nano Fe with liquid hydrofluoric acid to form nano $FeF_3$ in carbon, and milling to achieve a desired particle size.

According to another example embodiment, a method of providing electrode materials for a battery cell is provided. The method may include preparing a high capacity nanocomposite cathode of $FeF_3$ by reacting iron nitrate nonahydrate with hydrofluoric acid to yield hydrated iron fluoride, and heating the hydrated iron fluoride in argon. The method may further include preparing a high capacity nanocomposite anode of copper and silicon, and combining the high capacity nanocomposite cathode with the high capacity nanocomposite anode for a high energy density Lithium-ion battery cell.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may enable the provision of Li-ion batteries with high energy densities by employing nanostructured electrode materials. Thus, for example, the same electrical capacity may be provided with significantly less weight and cost. It also follows that, for example in connection with satellite/payload applications for space missions, increased energy density may provide significant savings in cost per unit of weight. As an example, if energy density may be increased by 3.5 times that of a conventional battery, up to $3.5M/5000 kg satellite may be saved. Increased capabilities may also enable space customers to develop higher power spacecraft buses and more capable payloads while also enabling more efficient nanosatellite missions.

Some example embodiments may represent a paradigm shift from conventional intercalation based Li-ion storage electrode materials to displacement reaction and alloying type, ultra-high, near theoretical Li-ion storage nanomaterials based on metal fluoride:carbon composite cathode nanomaterials and Cu:Si based anode nanomaterials. Employing nanostructured materials may increase the surface area and decrease diffusion lengths (e.g., decreasing target pore sizes in host material such as carbon and also decreasing particle size to improve the ratio of $FeF_3$ to C). Some embodiments may further employ materials synthesis to optimize specific material compositions for maximum energy density (e.g., employing solution chemistry, electrochemistry and/or mechanical milling techniques. Some embodiments may also involve materials characterization such as microscopy, particle size analysis, pore size analysis, X-ray diffraction for phase analysis, and electrochemical characterization. Example embodiments may, in some cases, also provide for scalable manufacturing of both anode and cathode materials for use in the high energy density batteries described herein, while maintaining high reaction kinetics at room temperature. Thus, some embodiments may enable $FeF_3$ to be generated in-situ inside pores of a carbon host, and may enable distribution and size of the $FeF_3$ to be tailored to decrease diffusion lengths and improve electrochemical activity at room temperature.

Figure 1:
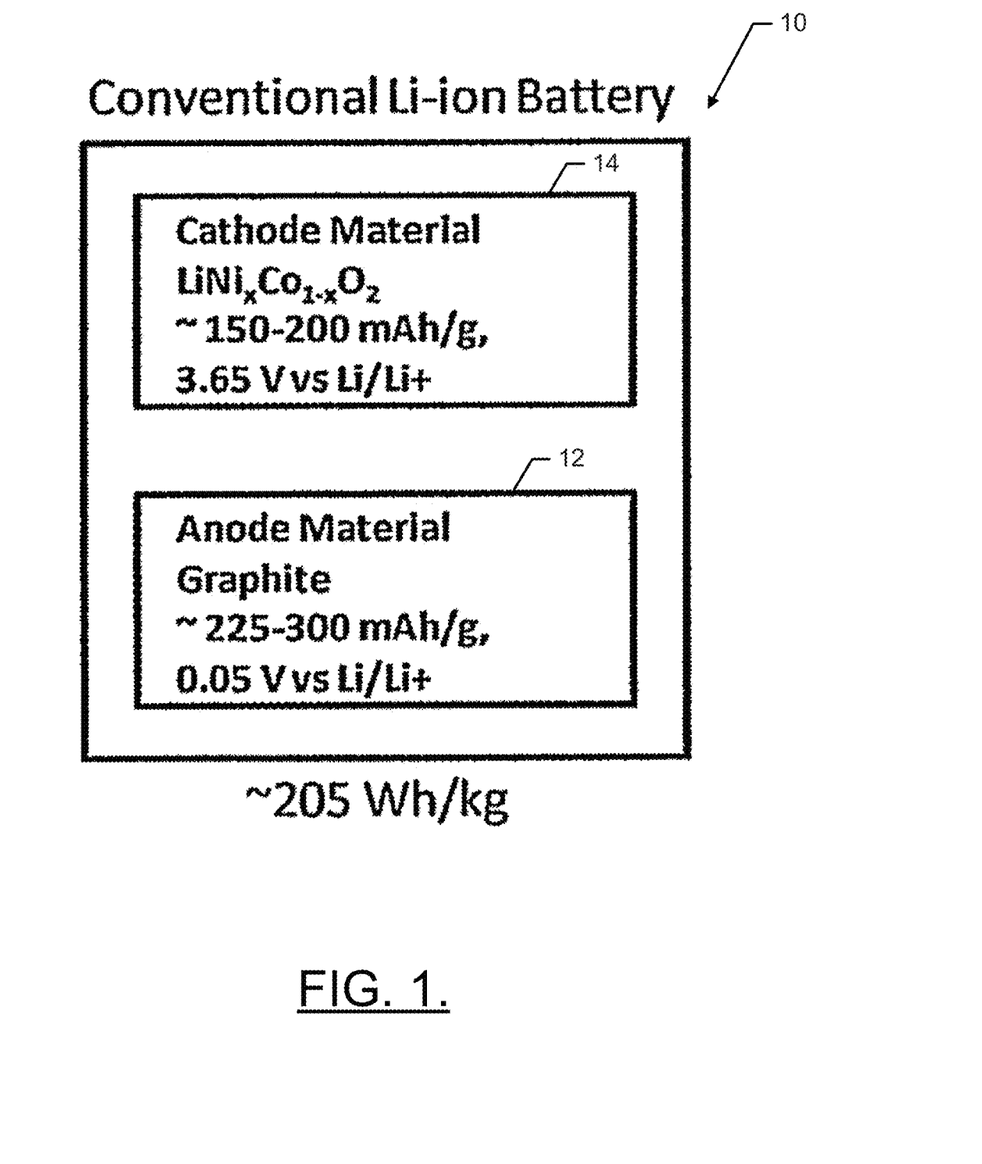
FIG. 1 is a block diagram of a conventional Li-ion battery.
Figure 2:
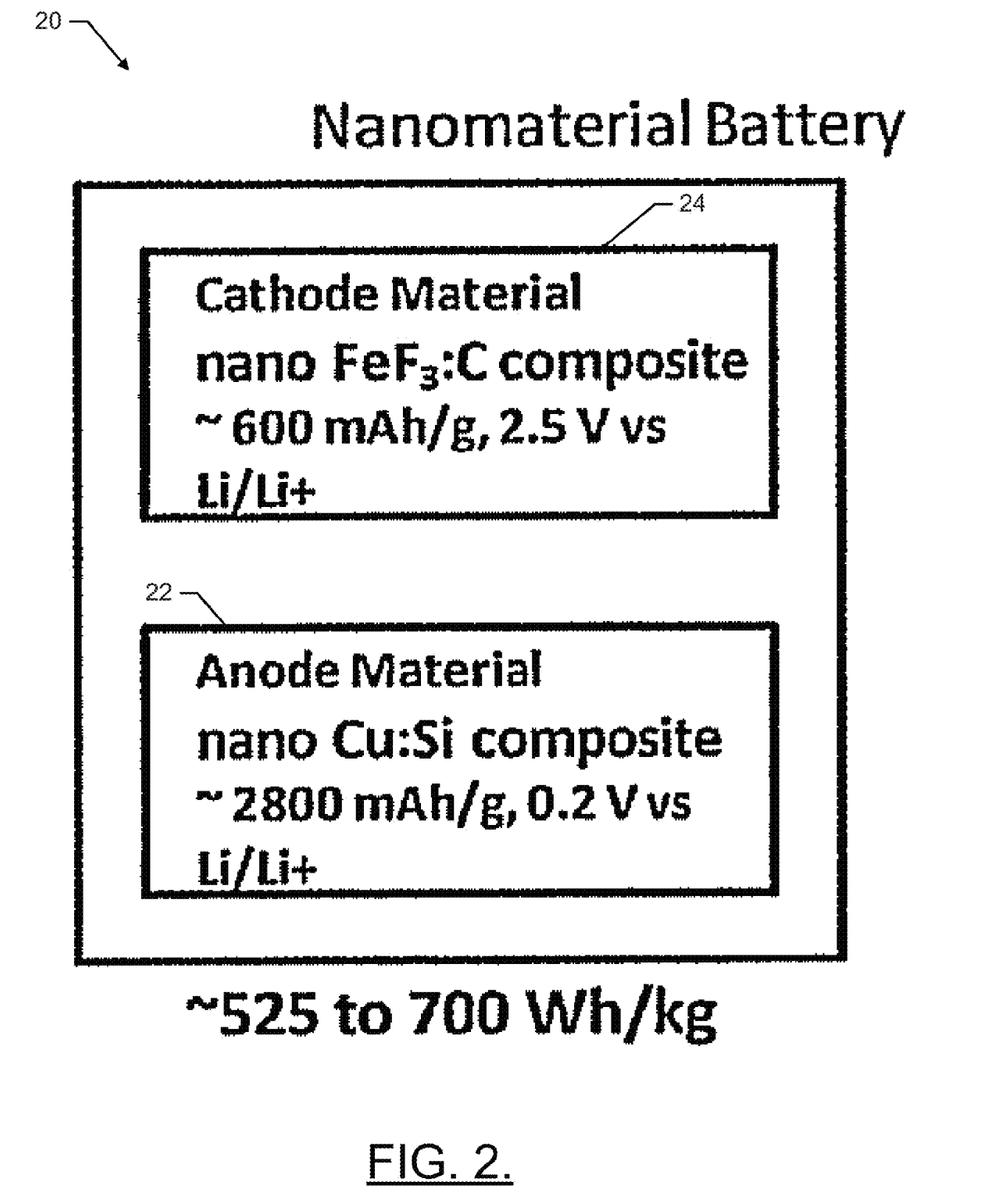
FIG. 2 illustrates a block diagram of a Li-ion battery employing nanomaterial electrodes according to an example embodiment.

FIG. 1 is a block diagram of a conventional Li-ion battery. The battery 10 may include an anode 12 and a cathode 14. As shown in FIG. 1, the material employed for the anode 12 may be graphite. Using such material may result in a capability of delivering about 225-300 mAh/g and 0.05 V vs $Li/Li^+$. The material employed for the cathode 14 may be $LiNi_xCo_{1-x}O_2$. Using such material may result in a capability of delivering about 150-200 mAh/g and 3.65 V vs $Li/Li^+$. Energy density deliverable by the battery 10 may be about 205 Wh/kg. FIG. 2 illustrates a block diagram of a Li-ion battery 20 employing nanomaterial electrodes according to an example embodiment. As shown in FIG. 2, the battery 20 may include an anode 22 and a cathode 24. As shown in FIG. 2, the material employed for the anode 22 may be a nano Cu:Si composite. Using such material may result in a capability of delivering about 2800 mAh/g and 0.2 V vs $Li/Li^+$. The material employed for the cathode 24 may be nano $FeF_3$:C composite. Using such material may result in a capability of delivering about 300 mAh/g and 2.5 V vs $Li/Li^+$. Energy density deliverable by the battery 10 may be about 525-700 Wh/kg. Thus, about 3.5 times improvement in energy density may be achievable by employing nanomaterials for the electrodes instead of using conventional Li-ion battery techniques.

Nano $FeF_3$:C nanocomposite bulk cathode material has excellent potential for exhibiting high specific capacities in the range of 600 mAh/g. Making the material nano-scale in nature may be useful for reducing Li-ion diffusion distances within the material and may also make the material more facile for reverse displacement with respect to the reaction: $3LiF+Fe \rightarrow FeF_3+3Li^+$. Nano-scale materials may also exhibit improved accommodation of strain during electrochemical cycling due to the large surface area to volume ratio inherent in the nanomaterial. Some embodiments may enable generation of FeF3 nanoparticles in-situ within nanopores of a porous carbon host matrix so that electrochemical cycling of a $FeF_3$ based cathode is possible, even at temperatures below 70 degrees C. Accordingly, a scalable, high energy density drop-in replacement cathode material for $LiCoO_2$ or other conventional low capacity cathode materials may be producible.

Figure 3:
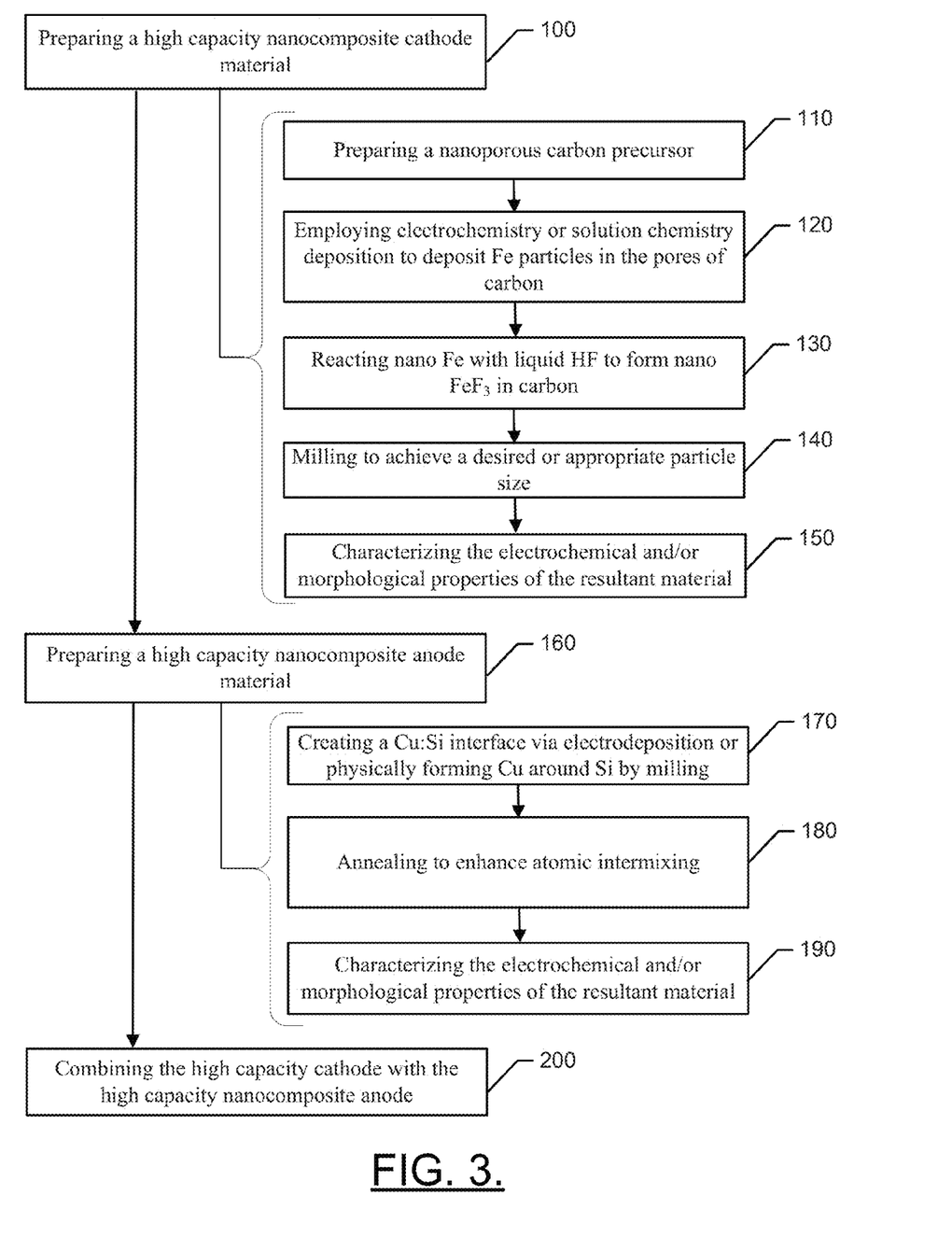
FIG. 3 illustrates an example method of creating a high capacity Li-ion battery having high capacity electrodes according to an example embodiment.
Figure 4:
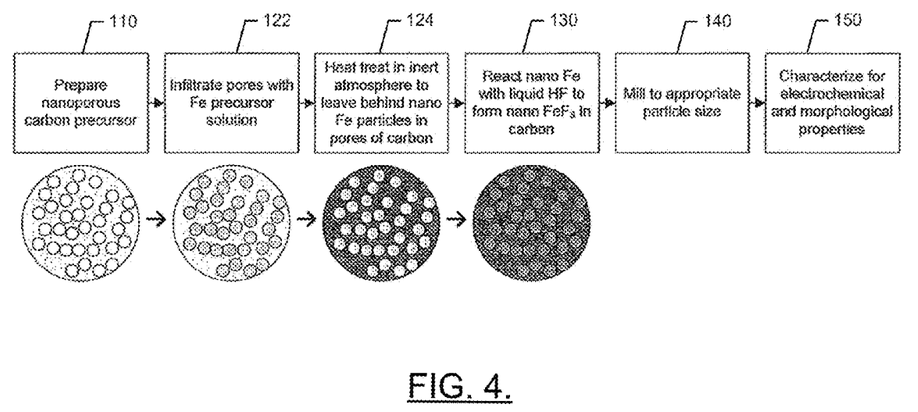
FIG. 4 illustrates a more specific example method of creating a high capacity nanocomposite cathode in which solution chemistry and inert annealing is employed for deposition of the Fe in pores of carbon.
Figure 5:
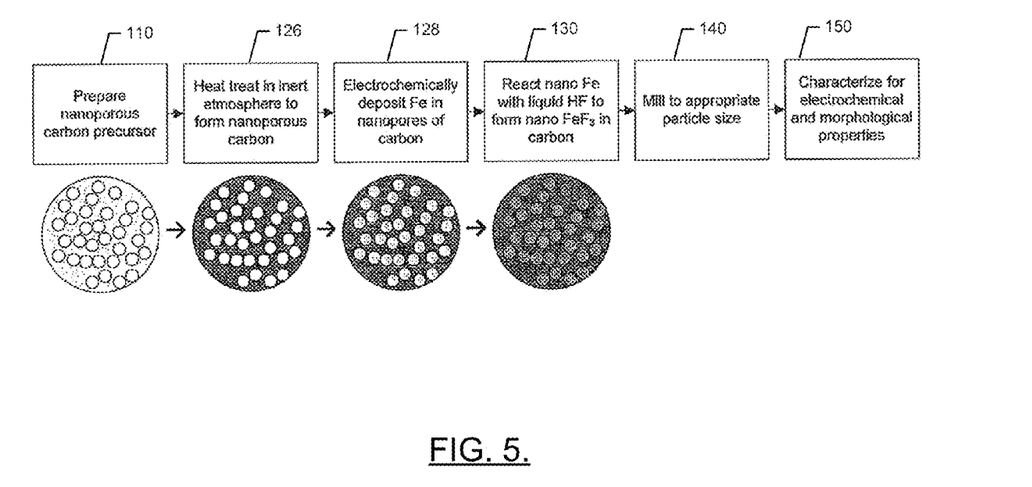
FIG. 5 illustrates a more specific example method of creating a high capacity nanocomposite cathode in which electrochemistry and solution chemistry, along with inert annealing, are employed for deposition of the Fe in pores of carbon.
Figure 6:
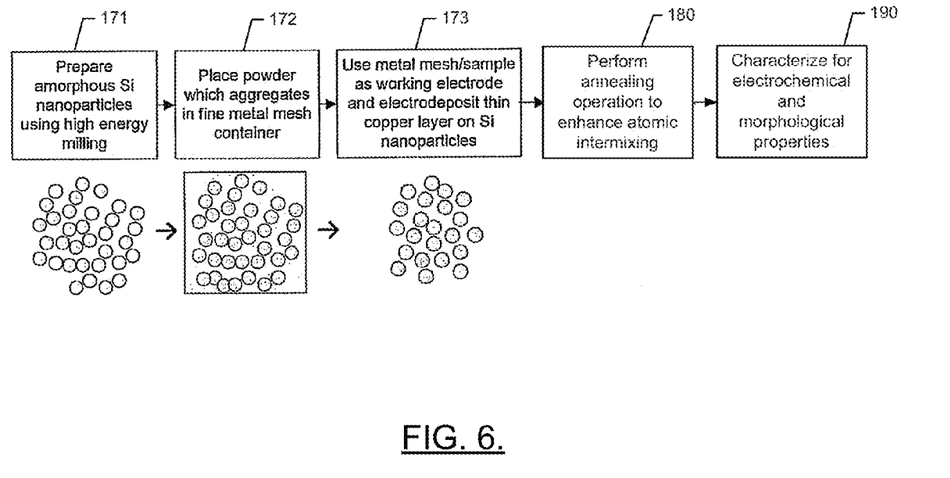
FIG. 6 illustrates a more specific method of preparing an anode material for a high capacity battery according to an example embodiment.
Figure 7:
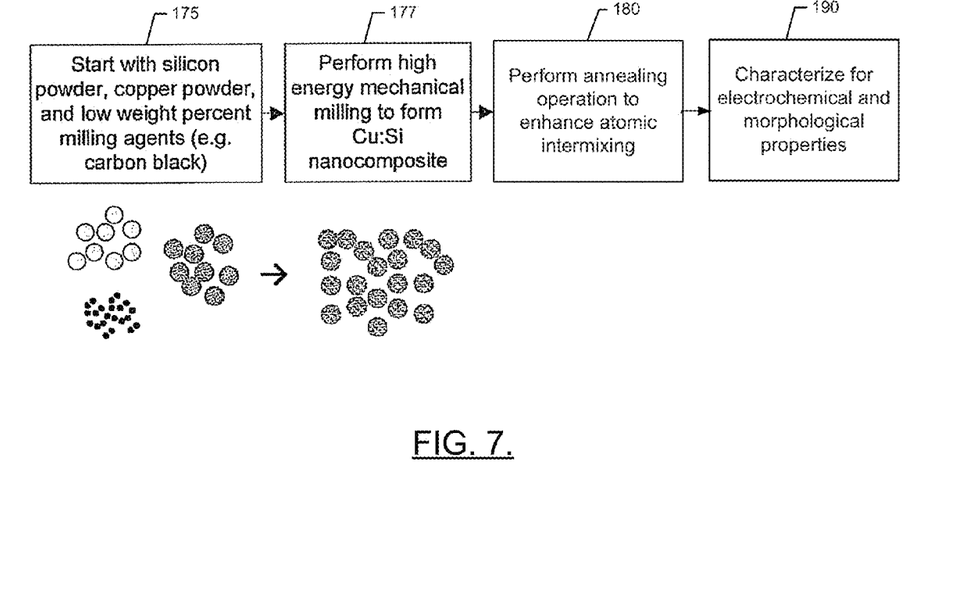
FIG. 7 illustrates a more specific method of preparing an anode material for a high capacity battery according to another example embodiment.

In an example embodiment, high capacity cathode material fabrication may be accomplished by employing electrochemistry and/or solution chemistry. In either case, a porous carbon precursor solution may initially be obtained. Electrochemistry or solution chemistry deposition techniques may then be employed to deposit iron (Fe) particles in the pores of carbon. Thereafter, nano Fe may be reacted with liquid HF to form nano $FeF_3$ in carbon and the result may be milled. Cathode material fabricated for high energy capacity may then be used in connection with anode material fabricated for high energy capacity. FIG. 3 illustrates an example method of creating a high capacity Li-ion battery having high capacity electrodes according to an example embodiment. The method of FIG. 3 may further include operations for provision of high capacity cathode material for combination with high capacity anode material to form a high energy density Li-ion battery according to an example embodiment. However, it should be appreciated that there may be multiple specific sequences within the more general method of FIG. 3 for generating both the high capacity cathode material and the high capacity anode material. FIG. 4 illustrates a more specific example method of creating a high capacity nanocomposite cathode in which solution chemistry and inert annealing is employed for deposition of the Fe in pores of carbon. FIG. 5 illustrates a more specific example method of creating a high capacity nanocomposite cathode in which electrochemistry and solution chemistry, along with inert annealing, are employed for deposition of the Fe in pores of carbon. FIG. 6 illustrates a more specific method of preparing an anode material for a high capacity battery according to an example embodiment. FIG. 7 illustrates a more specific method of preparing an anode material for a high capacity battery according to another example embodiment.

Referring now to FIG. 3, the method includes preparing a high capacity nanocomposite cathode material (e.g., such as cathode 24 of FIG. 2) of $FeF_3$ in carbon pores at operation 100, which may accomplished via operations including preparing a nanoporous carbon precursor at operation 110. In some embodiments, for example, carbon aerogel or an ion exchange resin such as a Purolite macronet material may be employed and infiltrated with an iron precursor solution such as iron chloride or iron nitrate. The method further includes employing electrochemistry or solution chemistry deposition to deposit Fe particles in the pores of carbon at operation 120. At operation 130, the method includes reacting nano Fe with liquid HF to form nano $FeF_3$ in carbon. Thereafter, the method includes milling to achieve a desired or appropriate particle size at operation 140. The milling may be, for example, mechanical milling or ball milling utilized to decrease the particle size. In some cases, the method may further include operation 150, which may include characterizing the electrochemical and/or morphological properties of the resultant material. Thus, for example, the preparation of the cathode material may conclude with screening the resultant material for its morphological and electrochemical properties.

Operation 100 (which may include some or all of operations 110 through 150) may represent a method for preparing a high capacity nanocomposite cathode. The method of FIG. 3 may further include preparing a high capacity anode material at operation 160, which may include creating a Cu:Si interface via electrodeposition or physically forming Cu around Si by milling at operation 170 and annealing to enhance atomic intermixing at operation 180. Operation 160 may further include characterizing the resultant material for electrochemical and morphological properties at operation 190. The method may then conclude by combining the high capacity nanocomposite cathode (e.g., generated via operations 110-150) with a high capacity nanocomposite anode (e.g., generated via operation 160-190) at operation 200 to generate a high energy density Li-ion battery cell.

As indicated above, the method of FIG. 3 may be performed by employing electrochemistry or solution chemistry deposition techniques to generate the cathode material. In this regard, as shown in FIG. 4, operation 120 may instead include specific operations associated with solution chemistry techniques. In this regard, for example, operation 120 may be replaced more specifically with operation 122 including infiltrating the carbon pores with an Fe precursor solution and operation 124 including applying heat treatment in an inert atmosphere to leave behind nano Fe particles in the pores of carbon. As such, for example, infiltrated carbon precursor (from operation 122) may be heat treated to an elevated temperature of about 600 to about 1000 degrees C. in an inert atmosphere to yield Fe filled pores in a carbon host. The powder may then be reacted with hydrofluoric (HF) acid to generate nano $FeF_3$ in the pores (in operation 130) after which time the above described milling process (of operation 140) may be initiated.

Alternatively, if an electrochemical deposition technique is preferred, operation 120 may instead include applying heat treatment in an inert atmosphere to form nanoporous carbon as shown in operation 126 of FIG. 5. As such, for example, a porous carbon precursor (e.g., a carbon aerogel or ion exchange resin such as a Purolite macronet material) may be immediately heat treated at an elevated temperature of about 600 to about 1000 degrees C. in the inert atmosphere to yield a nanoporous carbon host. Thereafter, at operation 128, Fe may be electrochemically deposited in the nanopores of carbon. Thus, for example, the powder may then be collected, placed in a suitable metal mesh container, and placed in an iron based electrolyte bath. With an iron counter-electrode, the metal mesh container/porous carbon powder may be used as the working electrode and current may be applied to electrodeposit iron nanoparticles inside the pores of the porous carbon host. Following iron electrodeposition, the iron:carbon powder may be placed in HF acid to generate $FeF_3$ nanoparticles in the pores of the carbon host (in operation 130) after which time the above described milling process (of operation 140) may be initiated.

In an example embodiment, anode material fabrication (e.g., in accordance with operation 160) may be accomplished by employing either scalable electrochemistry based methods involving electrodeposition or by employing scalable, high energy mechanical milling based methods to form Cu around Si to form the Cu:Si interface. While an $FeF_3$ based cathode material may be sufficient to exhibit reversible displacement reactions with all elements participating in the reaction, high energy density anode materials may be produced using a slightly different strategy. For example, silicon (Si) may be employed as a high capacity "active" material and copper (Cu) may act as an adhesive or "glue" to hold the Si together during the potentially extreme (e.g., about 400%) volumetric expansion that occurs when Si alloys with Li. The expansion may, in some cases, be so severe that if Si is cycled alone with no inactive "glue" phase, high initial capacity may be provided, but the capacity may fade drastically after only several cycles due to the material undergoing cracking such that electrical contact with the current collector is compromised. While the maximum theoretical capacity of lithiated silicon is about 3600 to about 4000 mAh/g, a parameter space in the about 2000 to about 3000 mAh/g range may be explored for use in connection with some embodiments by tailoring the percentage of Cu added to the Si and observing the effect on capacity retention as a function of cycle number. Thus, some embodiments may provide for a scalable production of bulk silicon based anode powder as a drop-in replacement anode material for graphite in conventional cells. Cu may form an effective interface with amorphous Si thin films during electrochemical lithiation and dilithiation. In thin film cases, testing has shown that the interface may preserve the capacity for a finite number of cycles and it may be possible to achieve previously unattained, near theoretical, reversible capacity values of about 3500 mAh/g for a Si based anode.

Thus, for example, alternative embodiments for performing operation 160 may be employed. More specifically, some embodiments may employ electrodeposition when performing operation 170, while other example embodiments may employ milling to physically form Cu around Si when performing operation 170. FIG. 6 illustrates an example method of preparing an anode material for a high capacity battery (e.g., operation 160 of FIG. 3) in which operation 170 is replaced with more specific sub operations. In this regard, as shown in FIG. 6, the method of this example embodiment includes preparing amorphous silicon nanoparticles using high energy mechanical milling at operation 171. At operation 172, powder that aggregates may then be placed in a fine metal mesh container. In some cases, the mechanical milling and placement of the powder into the mesh container may be followed by an electrodeposition operation. In this regard, a metal mesh/sample may be used as a working electrode and a thin Cu layer may be deposited on the Si nanoparticles at operation 173. By placing aggregated, milled powder in a fine mesh basket (at operation 172) and electrodepositing a very thin film of Cu on the Si powder (at operation 173), a high quality interface between the Cu and Si may be achieved to provide stabilization of very high specific capacities. Electrochemical and morphological properties of the resultant material may then be characterized at operation 190 after annealing (at operation 180).

An alternative method of preparing an anode material for a high capacity battery may include the use of a "one-pot" synthesis approach in which silicon powder, copper powder, and a milling agent such as carbon black are provided in various weight ratios at operation 175, as shown in FIG. 7. The powders and milling agent may then be milled via high energy mechanical milling to attempt to in-situ form a high quality Cu:Si nanocomposite at operation 177. A final annealing operation may then be performed to enhance atomic intermixing at the Cu—Si interface in the nanomaterials at operation 180 and electrochemical and morphological properties of the resultant material may then be characterized at operation 190. The degree of intermixing may play a significant role in determining the strength at the interface between the two materials. By performing operations 175 and 177 as specific sub operations of operation 170, the Cu:Si interface may be created by physically forming Cu around Si using milling processes.

The potential benefit of improving the capacity of cathode and anode materials to provide a high energy density Li-ion battery as provided in FIG. 2 may be projected by calculating the amount of active material present in a conventional battery, keeping the total mass of anode and cathode materials the same, inserting the expected gravimetric capacities of new anode and new cathode materials (i.e., materials generated via the examples of FIGS. 4-7 such that the capacity of the anode equals the capacity of the cathode), solving for the expected masses of anode and cathode materials, calculating the new battery capacity in Ah, multiplying by the average voltage of the new battery, and dividing by the total mass of the battery (kept the same for the conventional and new batteries). Thus, for example, the estimated improvement for a nanostructured electrode material battery (e.g., like the one in FIG. 2) may be up to 3.5 times improvement relative to the example shown in FIG. 1.

Table 1 below illustrates some parameters that may be employed in connection with an example embodiment. However, it should be appreciated that other performance parameters may be achieved by alternative embodiments. Thus, the parameters of Table 1 should be appreciated as non-limiting examples. The first two columns of Table 1 relate to parameters of a conventional Li-ion battery and the last two columns (i.e., the two right-most columns) relate to corresponding parameters of a high energy density Li-ion battery of an example embodiment.

TABLE 1

| | | | |
|---|---|---|---|
| Total Capacity | 370 Ah | Total Capacity | 1521-2031 Ah |
| Total Weight | 6.67 kg | Total Weight | 6.67 kg |
| Cathode Material | $LiNi_{1-x}Co_xO_2$ | Cathode Material | Nano $FeF_3$:C |
| Assumed Cathode Specific Capacity | 150-200 mAh/g | Assumed Cathode Specific Capacity | 600 mAh/g |
| Average cathode voltage | 3.65 V vs Li/Li+ | Average cathode voltage | 2.5 V vs Li/Li+ |
| Calculated weight of cathode material | 1.85-2.46 kg | Calculated weight of cathode material | 2.54-3.39 kg |
| Anode Material | Graphite | Anode Material | Nano Cu:Si |
| Assumed Anode Specific Capacity | 225-300 mAh/g | Assumed Anode Specific Capacity | 2800 mAh/g |
| Average Anode voltage | 0.05 V vs Li/Li+ | Average Anode voltage | 0.2 V vs Li/Li+ |
| Calculated weight of anode material | 1.23-1.64 kg | Calculated weight of anode material | 0.54-0.73 kg |
| Total Electrode Material Weight | 3.08-4.11 kg | Total Electrode Material Weight | 3.08-4.11 kg |
| Total Remaining Weight (packaging etc) | 2.56-3.59 kg | Total Remaining Weight (packaging etc) | 2.56-3.59 kg |
| Average Cell Voltage | 3.6 V | Average Cell Voltage | 2.3 V |
| Energy Density | 205 Wh/kg | Energy Density | 525-700 Wh/kg |

In order to manufacture a battery with high capacity electrode materials, operations associated with refining particle size of the electrode material using milling and sieving processes may be employed. Electrode material slurry preparation using polymer binders such as polyvinylidiene fluoride or Teflon, carbon black, n-methyl pryollidinone solvent, and the active material may also be employed. In some cases, electrode materials may be cast on a current collector such as copper or aluminum foils and a doctor blade or wire-wound rod may be employed to prepare a uniform height slurry. The solvent may be evaporated in a controlled fashion and the anode and cathode foils may be wound together with a separator such as, for example, a celgard type polyethylene:polypropylene layered tortuous separator disposed therebetween. The winding may be packaged in a can or other package and sealed using welding or other sealing processes. Contents may thereafter be evacuated and the package may be backfilled with electrolyte and sealed.

Figure 8:
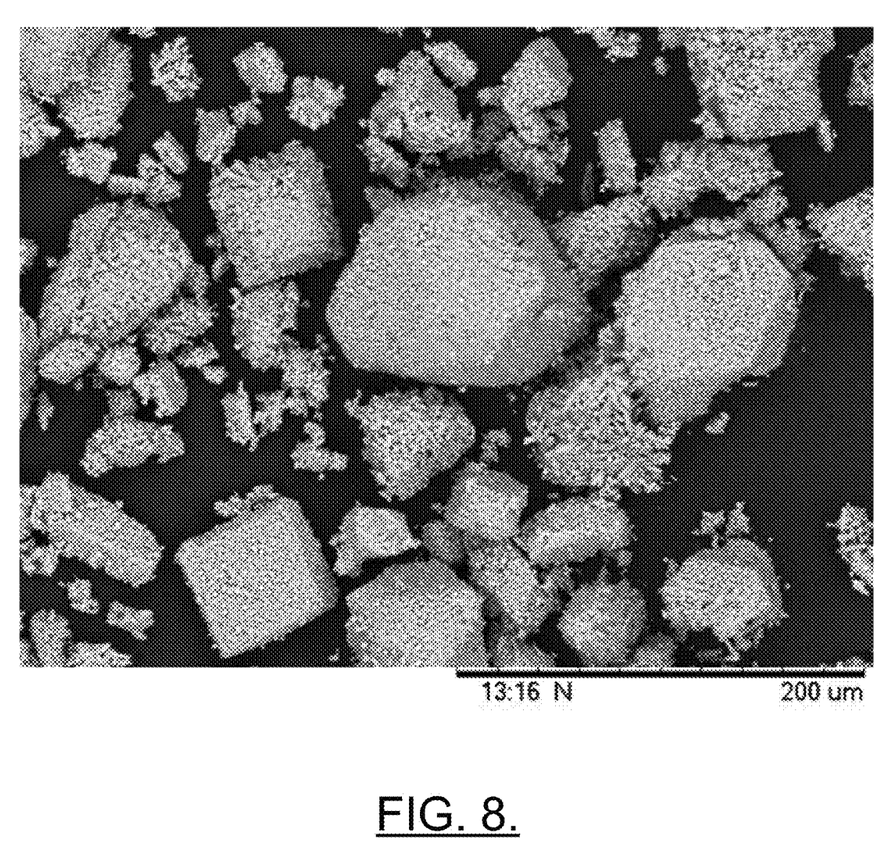
FIG. 8 illustrates via scanning electron microscopy the iron (III) fluoride particles synthesized using the described technique of reacting iron (III) nitrate nonahydrate $(Fe(NO_3)_3 \cdot 9H_2O)$ with hydrofluoric acid (HF) and then heat treating the product in argon to yield the final anhydrous material according to an example embodiment.
Figure 9:
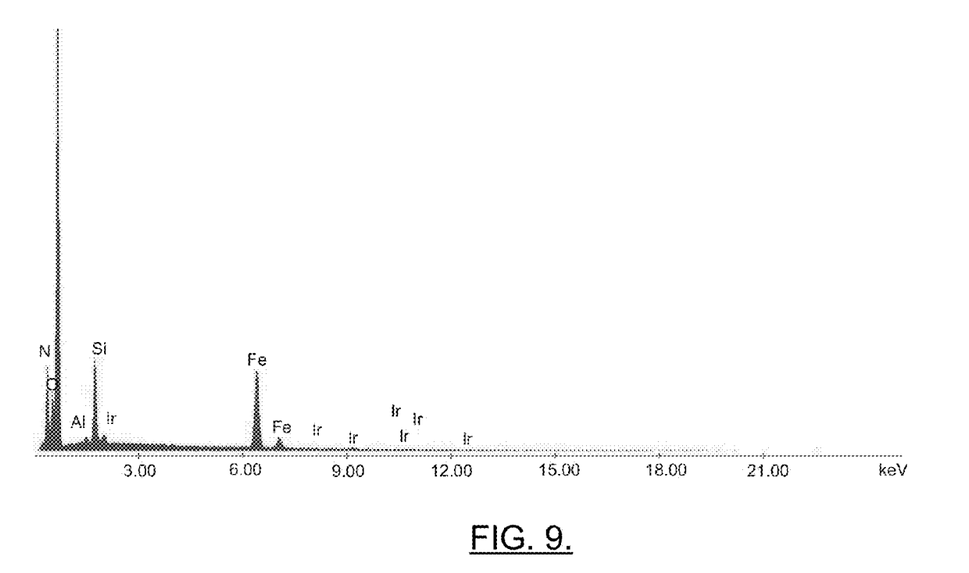
FIG. 9 demonstrates the $FeF_3$ material through energy dispersive spectroscopy according to an example embodiment.

In some embodiments, an alternative synthesis method to produce $FeF_3$ for use as a cathode material for lithium-based batteries may be provided. Specifically, for example, iron (III) nitrate nonahydrate ($Fe(NO_3)_3 \cdot 9H_2O$) may be reacted with hydrofluoric acid (HF). This reaction yields hydrated iron (III) fluoride ($FeF_3 \cdot xH_2O$). Heating the hydrated iron fluoride in argon (e.g., for two hours at 400° C.) may yield a final nano-scale iron (III) fluoride ($FeF_3$) product, as shown in FIG. 8. This is chemically illustrated in the reaction below:

In addition to FIG. 8, data demonstrating the successful synthesis of FeF$_3$ is shown in FIG. 9, by energy dispersive x-ray spectroscopy reveals the elemental existence of iron and fluorine in the final synthesized product.

Figure 10:
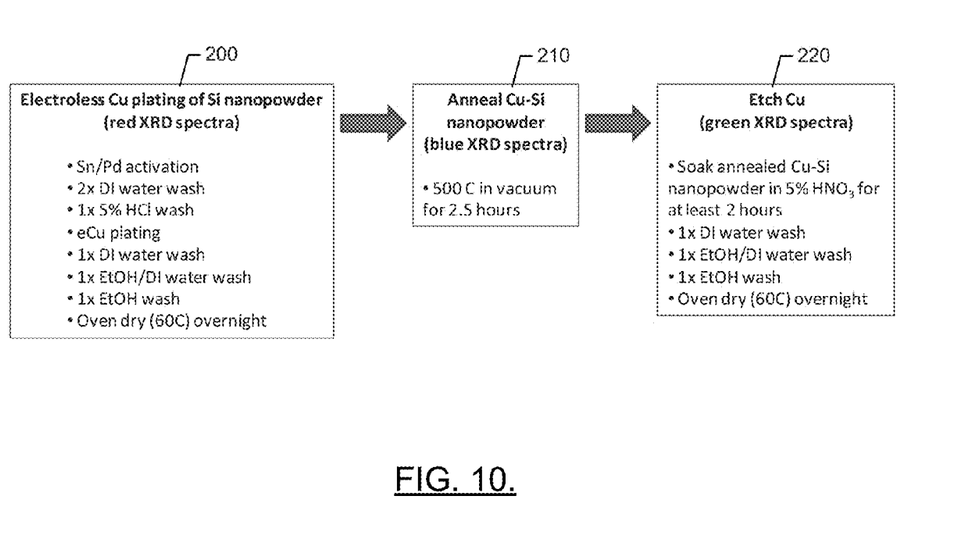
FIG. 10 is a flowchart of the synthesis of copper-coated silicon nanopowder for use as anode material in Li-ion batteries according to an example embodiment.

In some embodiments, a procedure for plating a thin layer of copper on silicon nanopowder is also provided. FIG. 10 illustrates a flowchart detailing example synthesis steps associated with the synthesis of copper-coated silicon nanopowder for use as anode material in Li-ion batteries. The three main steps of the copper plating approach are: 1) electroless plating of copper on silicon nanopowder at operation 200, 2) annealing the Cu/Si nanopowder at operation 210, and 3) etching excess Cu from the surface of the Cu/Si nanopowder at operation 220. Further details that may be employed in connection with one example embodiment of Cu/Si anode synthesis are also given in FIG. 10. However, it should be appreciated that the details of FIG. 10 are examples and not necessarily the only detailed steps that may be employed for anode synthesis in alternative embodiments.

Figure 11:
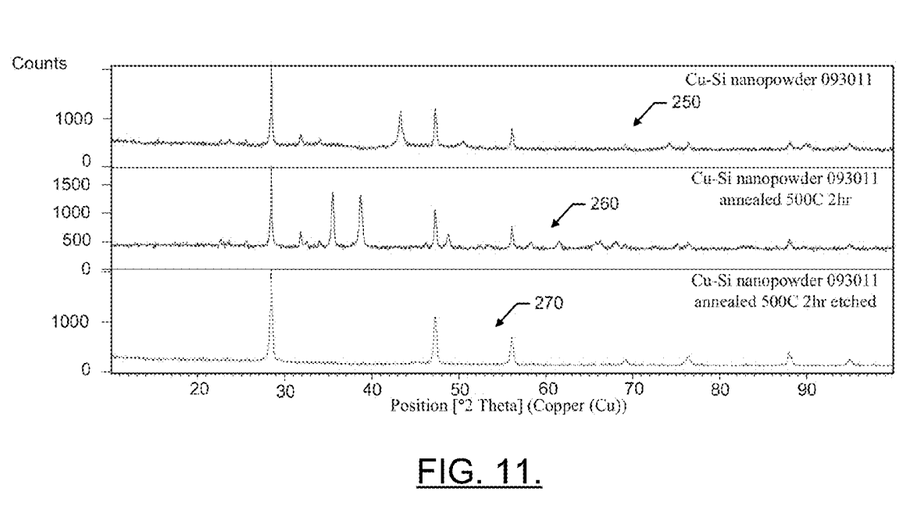
FIG. 11 shows the x-ray diffraction patterns of the Si/Cu anode material through the three discrete process steps described by the flowchart in FIG. 10 according to an example embodiment.
Figure 12:
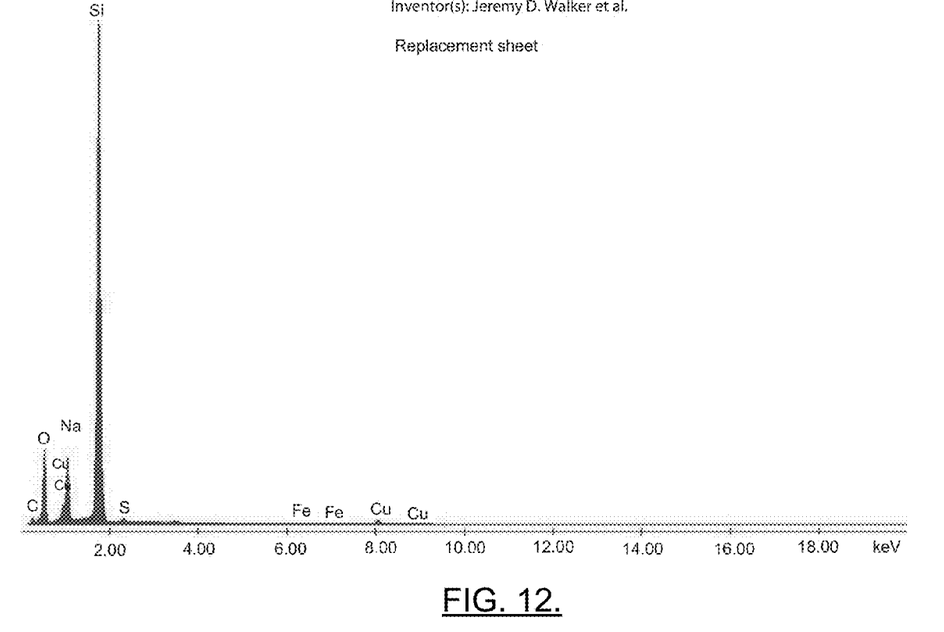
FIG. 12, through energy dispersive spectroscopy, demonstrates the existence of a thin layer of copper remains bonded to the silicon particles after the final etch step in the anode synthesis procedure according to an example embodiment.

FIG. 11 shows x-ray diffraction patterns at the conclusion of each of operations 200, 210 and 220 to illustrate the existence of the synthesis of a Cu/Si nanoscale anode material in an example embodiment. In FIG. 11, the electroless Cu plating of Si nanopowder corresponds to pattern 250, the annealing step corresponds to pattern 260, and the copper etching step corresponds to pattern 270. The pattern 250 reveals the existence of silicon and copper peaks. The pattern 260 shows that the silicon peaks remain, but copper (II) oxide is formed during the annealing step. Analysis of the pattern 270 shows only silicon peaks (no copper) on the post-etched samples. However, the EDS (Energy-Dispersive x-ray Spectroscopy—a surface sensitive materials characterization technique) pattern of the post-etched sample (FIG. 12) shows a large silicon peak (confirming the pattern 270) as well as the existence of copper. This demonstrates that the procedure described herein verifies the creation of silicon nanoparticles coated with a thin layer of copper.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of providing electrode materials for a battery cell, the method comprising:
   (i) preparing a high capacity nanocomposite cathode, the high capacity nanocomposite cathode comprising nanoporous carbon comprising a plurality of nano-sized pores and nano-sized FeF$_3$ particles located within the nano-sized pores; wherein preparing the high capacity nanocomposite cathode comprises:
      (a) providing the nanoporous carbon comprising the plurality of nano-sized pores;
      (b) impregnating the nano-sized pores with a liquid iron nitrate nonahydrate precursor solution to deposit iron nitrate nonahydrate within the nano-sized pores;
      (c) heating or evaporating the liquid iron nitrate nonahydrate precursor solution within the nano-sized pores of the nanoporous carbon in an inert environment to provide solid iron nitrate nonahydrate within the nano-sized pores;
      (d) reacting the solid iron nitrate nonahydrate located within the nano-sized pores from step (c) with liquid hydrofluoric acid to yield hydrated iron fluoride located within the nano-sized pores; and
      (e) heating the hydrated iron fluoride in argon to generate nano-sized FeF$_3$ particles within the nano-sized pores of the nanoporous carbon;
   (ii) preparing a high capacity nanocomposite anode of copper and silicon by:
      (a) electrolysis plating of copper on silicon nanopowder to produce Cu/Si nanopowder;
      (b) annealing the Cu/Si nanopowder; and
      (c) etching excess copper from a surface of the Cu/Si nanopowder; and
   (iii) combining the high capacity nanocomposite cathode with the high capacity nanocomposite anode for a high energy density Lithium-ion battery cell.

2. The method of claim 1, wherein the nanoporous carbon comprises a carbon aerogel.

* * * * *